United States Patent [19]

Pearson

[11] Patent Number: 4,851,686

[45] Date of Patent: Jul. 25, 1989

[54] ULTRAVIOLET RADIATION MONITORING DEVICE

[76] Inventor: Anthony P. Pearson, 73 Guthrie Street, Osborne Park, Australia

[21] Appl. No.: 164,243

[22] Filed: Mar. 4, 1988

Related U.S. Application Data

[63] Continuation-in-part of Ser. No. 897,778, Aug. 24, 1986, abandoned.

[30] Foreign Application Priority Data

Nov. 26, 1985 [AU] Australia ............... PG8290

[51] Int. Cl.$^4$ .................. G01J 1/46; G08B 23/00
[52] U.S. Cl. ................................. 250/372; 340/600
[58] Field of Search ................. 250/372; 340/600

[56] References Cited

U.S. PATENT DOCUMENTS

| | | | |
|---|---|---|---|
| 3,710,115 | 1/1973 | Jubb | 250/372 |
| 3,878,496 | 4/1975 | Erickson | 250/374 |
| 4,229,733 | 10/1980 | Tulenko et al. | 250/372 |
| 4,348,664 | 9/1982 | Boschetti et al. | 250/372 |
| 4,428,050 | 1/1984 | Pellegrino et al. | 250/372 |
| 4,608,492 | 8/1986 | Burnham | 250/372 |

*Primary Examiner*—Carolyn E. Fields
*Attorney, Agent, or Firm*—Harness, Dickey & Pierce

[57] ABSTRACT

A dosimeter monitors the ultraviolet radiation exposure of a body and provides an alarm when the cumulative radiation exposure attains a threshold level which is variable depending on the accumulated exposures of the body. A detector generates a sensing signal proportional to the intensity of ultraviolet radiation impinging the body. A first function of the sensing signal is integrated with respect to time to generate an active signal representative of the accumulated dose of radiation received by the body having regard to the intrinsic tolerance of the body. A second function of the sensing signal is integrated with respect to time to generate a reference signal representative of the optimal dose of accumulated radiation which is desired. An alarm is generated when the active signal magnitude attain the reference signal magnitude.

25 Claims, 4 Drawing Sheets

ULTRAVIOLET RADIATION MONITORING DEVICE

This application is a continuation-in-part of application Ser. No. 897,778, filed Aug. 24, 1986, now abandoned.

This invention relates to an electromagnetic radiation dosimeter which is particularly applicable for monitoring the amount of ultraviolet radiation falling upon a body such as the exposed skin of a person and providing an indication to the person when an optimum amount of ultraviolet radiation has been absorbed over a period of time.

In the past two hundred years, many millions of Caucasians have emigrated from temperate and cool climates to warmer tropical climates throughout the world, vis. America, South Africa, Australia, Israel, South East Asia et al. In light of the fact that it takes thousands of years for any biological change to occur in man, these immigrants and their hereditary offspring in future generations will very probably suffer from one form of skin cancer, or another. This is largely attributed to the absorption of an excessive amount of ultraviolet radiation by such persons in their biologically new environment, which may far exceed the level of ultraviolet radiations to which their bodies are accustomed, and, in fact are biologically capable of absorbing without detriment.

In Australia, particularly, it has become socially expedient for persons to acquire a suntan of their skins and so beachgoers and holiday makers spend a significant portion of their time sunbathing in the summer months. In most cases, such persons shall expose themselves to abnormal levels of ultraviolet radiation. Unfortunately, statistics show this activity to be extremely dangerous since it is considered to be a major contributing cause to skin cancer. In Australia alone, approximately six people die of skin cancer every week, and many tens of thousands more receive medical and surgical treatment for skin cancer related complaints every year. In the majority of cases, the afflicted person has been totally ignorant of the fact that he or she could be exposed to a dangerous level of ultraviolet radiation by obtaining a bad sunburn on a minimal number of occasions.

It has been determined from investigation that exposure of the skin to ultraviolet radiation of the kind received from the sun results in two different effects upon the skin. The first is erythema or burning of the epidermal skin layer, which arises from an over-exposure of the skin to the ultraviolet radiation. The second is the generation of added melanin pigmentation in the epidermal skin layer which provides a darker colouration or tan of the skin. In relative terms, the first effect can be obtained immediately upon exposure of the skin to high doses of ultraviolet radiation or to moderate doses of ultraviolet radiation over an extended period of time such as two to three hours. This effect is generally called sunburn and can last for a period of up to one or two days after the exposure of the skin to the radiation in moderate cases. On the other hand, the second effect is more delayed and is generally obtained after a succession of moderate exposures to ultraviolet radiation which should not result in erythema to prevent the epidermal skin layer from peeling off. Consequently the melanin pigmentation may be increased to provide a tan over a period of weeks or months.

The burning and tanning effects of exposure of the skin to ultraviolet radiation are related in the sense that the cumulative amount of ultraviolet radiation to which the skin may be exposed is dependent upon, inter alia, the amount of melanin pigmentation in the skin, whereby the increased pigmentation of the skin improves the tolerance of the skin to accumulated radiation to which the skin may be exposed without acquiring burning of the epidermal skin layer. Thus as a person acquires an increased pigmentation of the skin or tan from a series of exposures to ultraviolet radiation the tolerance of that person to erythema is increased allowing the person to be exposed to a nominal intensity of ultraviolet radiation for extended periods of time as opposed to a person with a low amount of pigmentation who may only be exposed to ultraviolet radiation for extremely short periods of time until such time as the melanin pigmentation of the skin increases.

BACKGROUND ART

In previously known devices for monitoring exposure to ultraviolet radiation, or dosimeters, such as disclosed in U.S. Pat. Nos. 4,428,050, 4,229,733, 4,608,492, 3,878,496, 3,710,115 and 4,348,664, it has been known to sense ultraviolet radiation impinging upon a body and provide an alarm when the cumulative amount of radiation to which the body has been exposed attains a threshold level beyond which erythema may occur.

Most of these devices, however, only have regard for the immediate effects of exposure of the skin to ultraviolet radiation and do not consider the delayed or tanning effect of the ultraviolet radiation upon the skin which vary dependent upon the accumulated exposures of the skin to ultraviolet radiation in the past. Accordingly, such devices are only applicable to persons that do not acquire a tan from successive exposures of the skin to ultraviolet radiation, since these devices are unable to even develop a weekly tanning profile.

Other devices which may have the ability to provide a tanning profile are reliant upon the user manually programming the device after each exposure of the skin to ultraviolet radiation and hence do not provide an automatic generation of tanning profile with minimal user interaction. Devices such as those disclosed in Pellegrino et al (U.S. Pat. No. 4,428,050) are software oriented involving complex algorithms which perform the necessary calculations to determine radiation dosage limits for persons exposed to ultraviolet radiation after the input of relatively detailed information to the computer operating the same. Such a device is not practical for all-purpose use and does not perform real-time monitoring of the exposure of a body to ultraviolet radiation and real-time determination of the tanning effect of the radiation, but rather establishes a program for a person to follow for tanning after the specification of a large number of input parameters by the user.

DISCLOSURE OF INVENTION

It is an object of the present invention to provide monitoring of ultraviolet radiation impinging a body and provide a sensorially perceptible alarm when the cumulative radiation to which the body is exposed attains a threshold level, which is variable depending upon the amount of accumulated exposures of the body to the radiation.

It is a preferred, although not essential objection of the invention to provide a device for monitoring ultraviolet radiation in accordance with a prescribed method which device is capable of being embodied as a self-contained, diminutive and portable unit, which can be carried on one's person during exposure to ultraviolet radiation.

In accordance with one aspect of the present invention, there is provided a dosimeter for monitoring exposure of a body to ultraviolet radiation comprising:

a sensing means for sensing radiation impinging a body and to generate a sensing signal proportional to the intensity of said impinging radiation;

a first integrating means to integrate a first function of said sensing signal with respect to time to generate an active signal representative of the accumulated dose of radiation received by said body having regard to the intrinsic tolerance of the body to said radiation;

a second integrating means to integrate a second function of said sensing signal with respect to time to generate a reference signal representative of the optimal dose of accumulated radiation to which said body is desired to be exposed; and control means to monitor the relative magnitude of said active signal and said reference signal and generate a sensorially perceptible signal in response to the active signal magnitude attaining the reference signal magnitude.

Preferably the first integrating means has a first memory means associated therewith to store said active signal magnitude and allow said active signal magnitude to diminish in accordance with a first prescribed decay function in response to a reduction in said sensing signal magnitude, said first prescribed decay function being related to a predetermined decay in the immediate effect of said accumulated dose on said body pursuant to said body being removed from said impinging radiation or vice versa, and said second integrating means has a second memory means to store said reference signal magnitude and allow the reference signal magnitude to diminish in accordance with a second prescribed decay function in response to a reduction in said sensing signal magnitude, said second prescribed decay function being related to a predetermined decay in the delayed effect of said accumulated doses on said body pursuant to said body being removed from said impinging radiation or vice versa, whereby the rate of decay of said delayed decay is less than the rate of decay of said immediate decay.

Preferably, the second function comprises initial and subsequent components, said initial component providing an initial integration at a greater rate than said first function, and said subsequent component providing a subsequent integration at a lesser rate than said first function.

Preferably the integrating means includes selector means to select different first functions dependent upon the tolerance of said body in connection with which said dosimeter is intended to be used.

In accordance with another aspect of the present invention, there is provided a method for monitoring electromagnetic radiation comprising the steps of:

sensing ultraviolet radiation impinging a body; generating a sensing signal proportional to the intensity of said impinging radiation;

performing a first integration of a first function of said sensing signal with respect to time to provide an active signal representative of the accumulated dose of radiation received by said body having regard to the intrinsic tolerance of the body to said radiation;

performing a second integration of a second function of said sensing signal to provide a reference signal representative of the optimal dose of accumulated radiation to which said body is desired to be exposed;

monitoring the relative magnitude of said active signal and said reference signal; and generating a sensorially perceptive signal in response to said active signal magnitude attaining said reference signal magnitude.

Preferably there is provided a method including the step of storing said active signal magnitude and allowing the active signal magnitude to diminish in accordance with a first prescribed decay function in response to a reduction in said sensing signal magnitude, said first prescribed decay function being related to a predetermined decay in the immediate effect of said accumulated dose on said body pursuant to said body being removed from said impinging radiation or vice versa, and storing said reference signal magnitude and allowing the reference signal magnitude to diminish in accordance with a second prescribed decay function in response to a reduction in said sensing signal magnitude, said second prescribed decay function being related to a predetermined decay in the delayed effect of said accumulated dose on said body pursuant to said body being removed from said impinging radiation or vice versa, whereby the rate of decay of said delayed decay is less than the rate of decay of said immediate decay.

BRIEF DESCRIPTION OF DRAWINGS

The invention will be better understood in the light of the following description of several specific embodiments thereof. The description is made with reference to the accompanying drawings wherein.

MODES FOR CARRYING OUT THE INVENTION

The first embodiment is directed towards an ultraviolet radiation dosimeter of diminutive size to enable the dosimeter to be worn on one's person.

Figure 1:
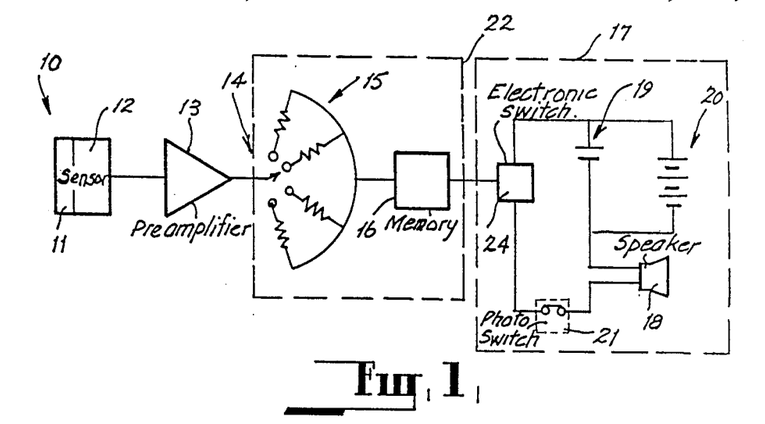
FIG. 1 is a block diagram of the dosimeter in accordance with the first embodiment of the invention.
Figure 3:
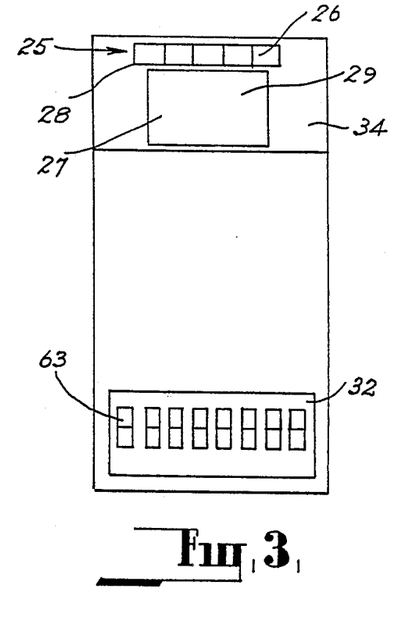
FIG. 3 is a plan view of the physical arrangement of the dosimeter.
Figure 4:
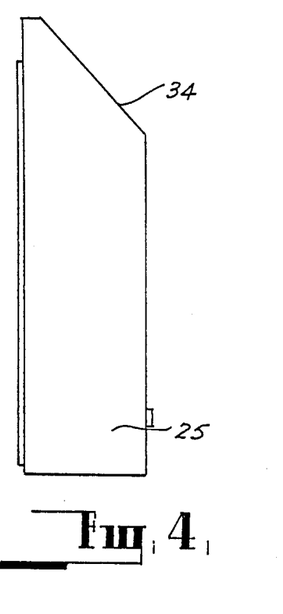
FIG. 4 is a side elevation of FIG. 3.

With reference to FIGS. 1, 3 and 4, the dosimeter comprises an outer casing 25 which encapsulates an electronic circuit, generally shown at FIG. 1, and appropriate transducers.

The casing 25 is provided with a window 27 which forms a surface 29 beneath which is located a sensing means 10 (see FIG. 1) comprising a filtering means 11 and detecting means 12. The filtering means 11 is a special ultraviolet filter which allows only ultraviolet radiation in the wavelength range of 290 nanometers to 400 nanometers to impinge the detecting means 12. This range is better known as including the UVA (320 nm to 400 nm) and the UVB (290 nm to 320 nm) types of ultraviolet radiation, the latter being the type that actually causes cancer of the skin and the former being the type that causes skin wrinkling and sunburn. The detector means 12 is a special type of transducer, being an enhanced silicon detector which provides a sensing signal in the form of an electric potential across a pair of terminals in response to impinging radiation. The magnitude of the signal is proportional to the intensity of the impinging radiation at any point in time. The output terminals of the detecting means 12 are in turn connected to a preamplifier 13 which amplifies the signal created by the electric potential to provide a sensing signal.

The output of the preamplifier 13 is connected to an integrating means 22 which includes a selector means 14, charge resistors 15, and memory means 16.

The selector means 14 is a single pole multi-throw switch, whereby a different value of charge resistor 15 is connected to respective terminals of the switch to provide a function of the sensing signal for integrating with respect to time by the integrating means. The integration performed by the integrating means 22 provides an active signal representative of the accumulated dose of radiation received by the body of a person having regard to the intrinsic tolerance of the body to the radiation. To effect integration of the sensing signal, the memory means 16 includes a capacitor, thus forming an R-C circuit. Accordingly the capacitor stores charge dependent on the magnitude of the sensing signal at a rate prescribed by the time constant of the R-C circuit which determines the function of the sensing signal.

The memory means also has a discharge resistor (not shown) coupled in parallel with the capacitor. The discharge resistor provides a path for the capacitor to discharge in the absence of the sensing signal. Accordingly the active signal magnitude is allowed to diminish at a rate determined by a prescribed decay function which is defined by the time constant of the capacitor and the discharge resistor. The prescribed discharge function is related to a predetermined decay in the immediate effect of the accumulated dose of impinging radiation on the body pursuant to said body being removed from said impinging radiation or vice versa.

The integrating means 22 consequently generates an active signal at its output proportional to the magnitude of the integration which output is connected to a control means 17.

The control means 17 effectively monitors the relative magnitude of the active signal and generates a sensorially perceptible signal in response to the active signal magnitude attaining a threshold level. The control means 17 comprises a comparator and electronic switching means 24. The electronic switching means 24 is open in response to the capacitor having a stored charge, represented by the active signal magnitude, below a prescribed threshold level determined by a preset reference signal magnitude at the comparator input, and is closed in response to the active signal magnitude exceeding the threshold level. The threshold level is related to the optimal dose of accumulated radiation to which the body of a person is desired to be exposed. In the present embodiment, the electronic switching means is of the relay type which is interposed between a power source 19 and a transducing means 18 which generates the sensorially perceptible signal providing an alarm.

The power source 19 is a DC battery which is connected to a recharging circuit 20 comprising an encapsulated solar cell 26 disposed in juxtaposed relation to another window 28 of the casing. Serially connected between the transducing means and the switch is a photo electric switch 21. The switch is closed upon light impinging thereon and open in the absence of such, thereby providing additional means to disable operation of the device.

With reference to the physical arrangement of the device, as shown in FIGS. 3 and 4, the selector means 14 is provided in the form of a multi range switch 32. Accordingly the switch is provided with a number of positions which accord with the selection of a specific first resistor means 15 of the integrating means 22. The windows 27, 28 for the sensing means 10 and solar cell 26 are disposed on a sloping face 34 of the casing which is arranged at an oblique angle to the base and ends of the casing 25. This is to enable the windows to be exposed to impinging ultra-violet radiation in most attitudes that the casing would be likely to presume when carried by a user of the device. To achieve the best results, the casing is attached to a clothing item such as the hat of a user, where the sloping face 34 can be exposed to the ultraviolet radiation source for example the sun, continuously irrespective of whether the user is vertical or horizontal to the ground.

A cover 30 is attached to the casing to enable it to be moved from an open to closed position and vice versa. In the closed position, the cover is adapted to impede the passage of ultraviolet radiation and light to the filtering means 11 and the photo electric switch 21 respectively, thereby disabling the device. In the open position, this impediment is removed and the device maybe enabled for operation.

Alternately an on/off switch is provided next to the skin type selector switches.

In operation the device receives ultraviolet radiation through the filtering means 11 which discriminates between the various frequencies of the impinging radiation and only allows the passage of radiation which causes cancer and wrinkling, i.e. UVB and UVA, respectively through to the detecting means 12. The detecting means then produces a potential that is proportional in magnitude to the amount or magnitude of radiation applied thereto and thus generates a sensing signal which is amplified by the preamplifier and subsequently applied to the integrating means 22. The integration performed by the integrating means on the function of the sensing signal with respect to time effectively provides monitoring of the amount of harmful radiation falling upon the device over a period of time. Accordingly when the active signal magnitude, representing the amount of charge stored within the memory means, exceeds the threshold level, the control means activates the transducing means 18 which generates a sensorially perceptible signal to the user or wearer of the device.

In the absence of incident radiation passing through the filtering means, the stored charge in the storage means will not be replenished and hence will effectively diminish in accordance with the prescribed decay function.

In practice, the rate that the active signal increases and diminishes is set to correspond to the intrinsic ability of the skin of a user or wearer to absorb ultraviolet radiation. Thus the device will be very sensitive on the user's first day of exposure to ultraviolet radiation by selecting a suitable resistor 15 to combine with the capacitor of the memory means 16 to provide a function of the sensing signal which results in a relatively fast rate of increase of the active signal upon integration subject to the presence of the sensing signal. Accordingly the alarm will be activated after a longer period of time of exposure of the user and the device to the radiation. Thus as the skin of the user is progressively tanned, other first resistors can be selected to provide longer delays. It should be noted however, that on the user sheltering himself from the sun, the active signal diminishes at a rate determined by the prescribed decay function. Thus the memory means operates to cater for situations where the user may be re-exposed to the ultraviolet radiation after only a short period of time has elapsed. In such cases the capacitor would not be fully discharged and thus will cause the active signal to approach the threshold level after a very much shorter period of time than before. This is commensurate with the ability of the user's skin to absorb further radiation after only a short relaxation from previous exposure, which in most cases is not very great. The provision of the selector means allows the device to be adjusted to match the different types of skin sensitivity of users of the device. In addition, the selector means allows a particular user to dampen the sensitivity of the device if the user has already acquired a partial tan before using the device, thereby increasing the allowable time of exposure of the skin to impinging ultraviolet radiation.

The second embodiment is directed towards a dosimeter for monitoring ultraviolet radiation incorporating several improvements over the dosimeter described in the preceding embodiment. The present embodiment is described with reference to FIGS. 2, 3 and 4 of the drawings.

Figure 2:
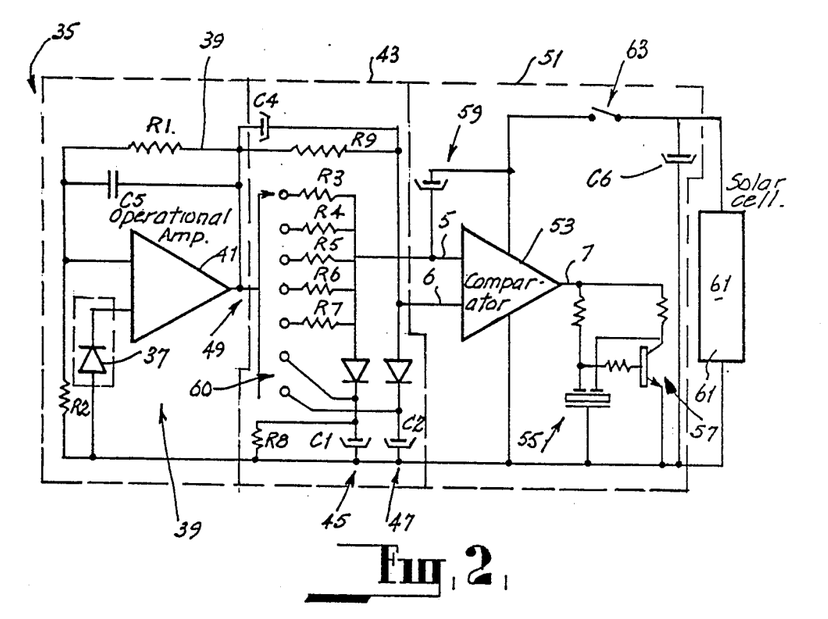
FIG. 2 is a circuit diagram of the dosimeter in accordance with the second embodiment of the invention.

As in the preceding embodiment, the present dosimeter generally comprises a sensing means, integrating means and control means. The electronic circuitry of the sensing means is shown generally at 35 and includes a filtering means (not shown) and detector means 37 as described in the preceding embodiment.

The output of the detector means 37 is connected to the input of the preamplifier 39 comprising an operational amplifier. As shown in FIG. 2, the operational amplifier 41 is connected in the non-inverting amplifier mode, wherein the output of the detecting means 37 is connected to the non-inverting input of the operational amplifier 41 and the gain of the amplifier is provided by means of resistors R1 and R2. For the present application, these resistors are set to provide a gain of approximately 80. Coupled in parallel to resistor R1 in the feedback loop of the amplifier is a capacitor C5, which forms a delay means, the function of which shall be described in more detail later.

The output of the preamplifier 39 is connected to the integrating means 43, which is divided up into a first and second integrating means respectively comprising first and second resistor means and being respectively associated with first memory means 45 and second memory means 47.

A plurality of differently valued first resistor means R3 to R7 are provided in the form of a selector means 49, wherein the resistor means are arranged in order of increasing value and can be selected so that a single resistor can be discretely coupled in series with the first memory means 45 and the output of the preamplifier 39. The first memory means 45 comprises a first capacitor means C1 which combines with the particular selected first resistor means to provide a time constant which defines a first function of the sensing signal output from the amplifier 41. This first function is of a similar kind to that described in the first embodiment, but when considered in the context of the present embodiment, is determined on a slightly different conceptual basis than the latter. This shall be discussed in more detail later.

Coupled in parallel to the first capacitor C1 is a discharge resistor R8 which provides another time constant for the discharge of the capacitor means, so defining a first prescribed decay function. The first prescribed decay function is substantially identical to that described in the preceding embodiment.

The second memory means 47 comprises a second capacitor C2 which is also connected to the output of the preamplifier, but via the second resistor means R9. The second resistor means R9 combines with the second capacitor C2 to provide a further time constant defining in part, a second function for the sensing signal output from the amplifier 41.

Coupled in parallel to the second resistor means R9 is a bypass capacitor C4 which also combines in series with the second capacitor C2 to define the other part of the second function for the sensing signal.

Accordingly, the second function consists of an initial and a subsequent component, wherein the initial component is defined by the combination of the bypass capacitor C4 connected in series with the second capacitor C2, and the subsequent component is provided by the combination of the second resistor R9 connected in series with the second capacitor C2. The function of these components is arranged such that the initial component provides an initial integration of the sensing signal appearing at the output of the preamplifier 39 at a greater rate than the first function, and the subsequent component provides a subsequent integration at a lesser rate than the first function.

The respective outputs of the first and second capacitors C1 and C2 are connected via diodes D1 and D2 respectively to the inputs of the control means 51. These diodes prevent the discharge of the respective capacitors back through the input circuit of the integrating means. Thus, in the case of the first capacitor C2, discharge of the same is only provided by its innate leakage which defines a second prescribed decay function. Obviously, the second prescribed decay function provides a rate of decay significantly less than the rate of decay as provided by the first prescribed decay function for the first capacitor C1.

The integrating means is provided with a further switching means 60 which is incorporated into the selector means 49 to enable independent discharging or resetting of the capacitors C1 and C2 by the user. This is provided by directly connecting the output of the preamplifier to a capacitor selected by the further switching means 60, which effectively sinks the stored charge within the selected capacitor.

The control means 51 comprises a comparator 53, transducing means 55 and electronic switching means 57. The comparator 53 has its inputs 5 and 6 connected to the outputs of the first memory means 45 and second memory means 47 respectively, and its own output 7 connected serially to the transducing means 55 and electronic switching means 57.

The electronic switching means 57 is in the form of a transistor connected in the common emitter configuration. The base and collector terminals of the transistor are both driven by the output 7 of the comparator and so is switched on only in response to an active output signal being provided by the comparator. The transducing means 55 is in the form of a piezo-electric crystal having an integrated oscillating circuit provided therein. The electronic switching means 57 is connected intermediate the comparator 53 and transducing means 55 to enable and disable the piezo-electric crystal and oscillating means in response to the condition of the comparator. On activation of the piezo-electric crystal the oscillating means functions to drive the crystal at a prescribed frequency enabling the same to produce a sensorially perceptible signal, particularly perceptible to the aural senses of a person using the device.

The control means also includes a triggering means 59 in the form of an actuating capacitor C3 coupled between a power source 51 for the device and the output of the first memory means 45. The triggering means 59 is provided to incite generation of the sensorially perceptible signal by the control means for a short period on initially supplying power to the device. The operation of this shall be described in more detail later.

The power source 61 is in the form of a solar cell providing power to the device via a switch 63. To facilitate operation of the solar cell, a storage capacitor C6 is connected across the power terminals thereof to sustain the output voltage of the cell.

With reference to the physical configuration of the device, as shown in FIGS. 3 and 4, the arrangement is substantially identical to that of the preceding embodiment. Thus, the filtering means and detecting means 37 are provided beneath the window 27, the solar cell 61 is provided beneath the window 28, and the selector means 49 is provided by way of the multi-range switch 32 of the device. In addition, the power switch 63 can be provided separately on the casing as shown at 65, or incorporated into a position provided on the multi-range switch, whereby the device may be turned off or on by moving the switch into or out of this position respectively.

The operation of the device shall now be described.

The filtering means and detecting means of the sensing means 35 operates substantially the same as in the preceding embodiment. A sensing signal is provided at the output of the detecting means 37 which is input to the non-inverting input of the operational amplifier 41 and is subsequently amplified by the preamplifier arrangement 39 to provide a sensing signal input to the integrating means 43.

The first integrating means and the second integrating means contemporaneously integrate this sensing signal via respective parallel paths which respectively include the first memory means 45 and the second memory means 47. The first path integrates the first function of the sensing signal with respect to time to generate an active signal at the output of the first memory means 45, which is representative of the accumulated dose of radiation received by the body of the person using the dosimeter and which has regard to the intrinsic tolerance of the body to the impinging radiation. The second path integrates the second function of the sensing signal with respect to time to generate a reference signal at the output of the second memory means 47 which is representative of the optimal dose of accumulated radiation to which said body is desired to be exposed. The basis of this function shall be described in more detail later.

As previously described, the rate of integration of the second memory means 47 is initially greater than that of the first memory means 45 since on the initial generation of the sensing signal the bypass capacitor C4 functions to bypass the second resistor means R9 associated therewith and so enables the second capacitor C2 to charge very rapidly. This rapid charge will continue until the additive charge of the second capacitor C2 and bypass capacitor C4 approaches the magnitude of the sensing signal, whereon additional accumulative charge will be diverted through the second resistor means R9. This diversion subsequently has the effect of the second capacitor C2 charging at a subsequent rate prescribed by the subsequent component of the second function of the sensing signal. Thus, effectively the second capacitor means C2 charges at an initial rate which is greater than the charging rate of the first capacitor C1, so providing a reference signal magnitude that is initially higher than that of the active signal. However, on subsequent charging, the second capacitor C2 will proceed at a charging rate slower than that of the first capacitor C1. Thus after a time which is prescribed by the selected values of the first resistor means R3 to R7, second resistor means R9 and the capacitors C1, C2 and C4, the active signal magnitude shall eventually attain the threshold level set by the reference signal magnitude.

The comparator 53 of the control means 51 effectively monitors the relative magnitudes of the active signal and reference signal, so that during the period that the active signal is less than the reference signal the output of the comparator is deactivated, and on the active signal magnitude attaining the threshold level set by the reference signal magnitude, the comparator output will be activated. On activation of the comparator output, the electronic switching means will be turned on enabling the operation of the transducing means 55.

It should be noted that an important feature and difference of the present embodiment over the preceding embodiment, is that the integrating means 43 is divided into first and second integrating means so as to generate an active signal which progressively increases in magnitude and a reference signal which also progressively increases in magnitude, and thus providing a threshold level which rises progressively at two different rates as determined by the second function of the sensing signal. Consequently the first function of the sensing signal can be chosen simply having consideration to the intrinsic tolerance of the particular person's skin type alone and the second function of the sensing signal may be predetermined to provide a reference signal at different threshold levels in time dependent upon the intensity of the received radiation and the acquired tan of the skin from previous exposures. Thus the selector means of the dosimeter need not be changed on successive exposures to the impinging ultraviolet radiation by the user on different days as the user's tolerance to radiation increases. This effect is achieved principally by providing a reference signal magnitude which automatically increases on increased exposure of the device to ultraviolet radiation, and having the second capacitor C2 diminishing the reference signal magnitude only in response to the second prescribed decay function, in contrast to the first capacitor C1 diminishing the active signal magnitude in accordance with the first prescribed decay function. Moreover the first prescribed decay function is set so that the first capacitor C1 discharges fully overnight, whereas the second prescribed decay function is set so that the second capacitor C2 discharges fully over a period of approximately 1 month. Thus, on a person exposing themselves to ultraviolet radiation on successive days for the prescribed periods of time as determined by the dosimeter, the second capacitor C2 will have some residual charge after a previous days use of the dosimeter, thereby providing a reference signal at a magnitude on commencing use of the dosimeter than was the case of the previous day. Accordingly, the first capacitor C1 will take a longer period of time to attain the level of the reference signal and so by selecting suitable component values, the second integrating means can be arranged to simulate the build-up of Melanin pigmentation in the skin of the user of the dosimeter and thus allow for safe prolonged periods of exposure to ultraviolet radiation ensuring the safe progressive tanning of the user's skin.

Therefore, to use the dosimeter it is only necessary for a user to select the appropriate position of the multi-range switch 32 to match his particular skin type and position the dosimeter on his person to receive impinging ultraviolet radiation during exposures of his person to the same. The dosimeter will subsequently determine the period of time for safe exposure of the user to ultraviolet radiation and will automatically compensate for the acquisition of a tan.

On initial switch-on of the device, the triggering means 59 operates to provide an active signal which is initially higher in magnitude than the reference signal for a very short period of time, and which is sufficient to incite generation of the sensorially perceptible signal momentarily. This period will only last until the actuating capacitor C3 charges up to the potential of the power source supplied to the device. To enable this action to occur without detriment to the subsequent operation of the integrating means 43, the delay means operates to negate the function of the sensing means for the duration of the period that the active signal exceeds the level of the reference signal. This is achieved by the bypass capacitor C4 negating the effect of the feedback resistor R1 momentarily thus suppressing the gain of the preamplifier until such time as the bypass capacitor C4 charges to divert the feedback current through feedback resistor R1. By the time that the gain of the preamplifier is reinstated, the effect of the triggering means 59 would have been completed.

An incidental feature of the device is that the comparator 53 is provided with further triggering means in the form of an intrinsic capacitance at each of its inputs (not shown). This capacitance is inherent within the circuit as configured within an integrated circuit arrangement. Accordingly, whenever the sensing signal which is input to the integrating means 43 is absent concurrent with power being supplied to the device, as may arise when the detecting means 37 is obstructed from impinging radiation by some impediment, the intrinsic capacitance discharges back through the integrating means via the reference and active lines respectively. The time constants for the respective discharge lines will consequently be determined by the second and first functions respectively. Since the bypass capacitor C4 determines the initial component of the second function, the intrinsic capacitance will be allowed to rapidly discharge initially by bypassing the second resistor means R9, in contrast to the discharge of the intrinsic capacitance via the first resistor means R3-R7 of the active line. Consequently, the reference signal will initially rapidly diminish in comparison to the active signal causing the reference level to be attained by the latter, and so activating the comparator output enabling the operation of the transducing means 55.

Thus the sensorially perceptible signal will be generated whenever impinging radiation is intentionally or unintentionally obstructed from the detecting means by some impediment. For example by a fly or suntan lotion landing on the device covering the sensing window 27.

Figure 5:
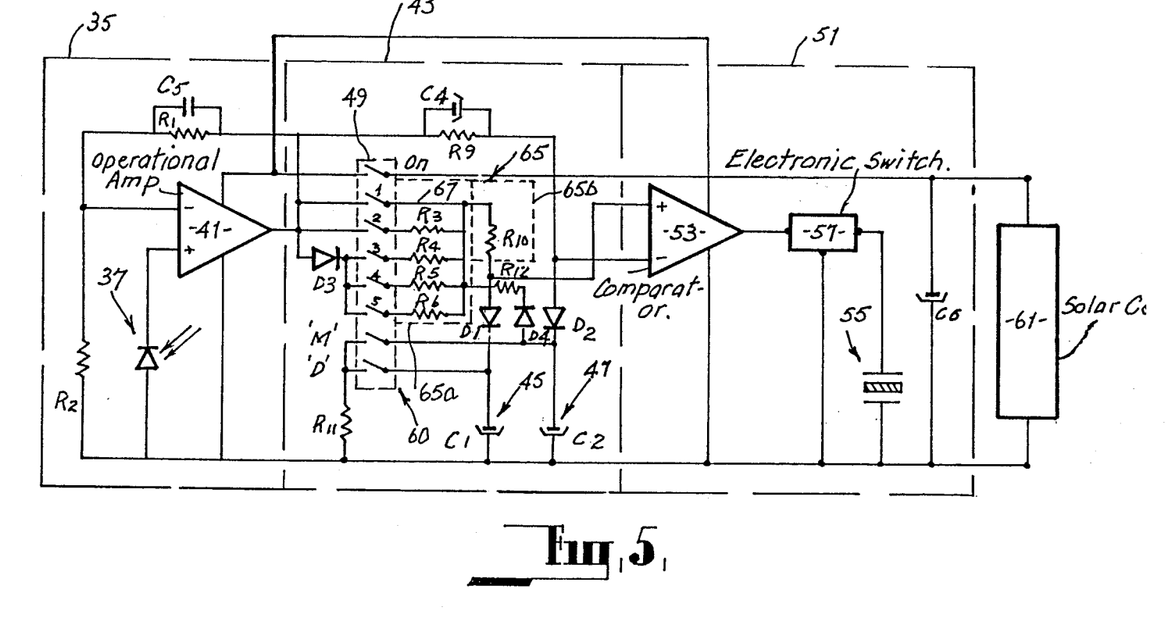
FIG. 5 is a circuit diagram of the dosimeter in accordance with the third embodiment of the invention.

The third embodiment of the invention is substantially similar to the previous embodiment and accordingly the same reference numerals have been used to identify corresponding components.

As shown at FIG. 5 of the drawings, the dosimeter of the present embodiment generally comprises sensing means 35, integrating means 43 and a control means 51 as did the previous embodiments. The sensing means 35 and control means 51 are essentially identical to the same components of the second embodiment and derive power from the solar cell 61.

The integrating means 43, however, is marginally different, whereby the first integrating means, first memory means 45 and second memory means 47 are arranged differently. Moreover, the first integrating means includes a selector means 49 and a plurality of first resistor 65 means divided into two stages 65a and 65b between the operational amplifier 41 and the first memory means 45. The first stage 65a comprises a bank of differently valued resistors R3-R6 connected in parallel with each other and in series with the selector means 49 much in the same way as in the previous embodiment with the exception of there being an additional short circuit connection 67 in the place of one of the resistors. The second stage 65b of the first resistor means, however, comprises an additional resistor R10 connected in series between the common output of the first stage 65a and the diode D1. Additionally, a further diode D3 is connected in series to three of the resistors in the first stage R4-R6 between the operational amplifier 41 and the input side of the selector means 49. The function of the further diode D3 shall be described in more detail later.

As in the previous embodiment, the resistors which comprise the first stage 65a of the first resistor means are arranged in order of increasing value and upon operation of the selector means 49, one of the resistors R3-R6 or the short circuit 67 will be connected in series with the resistor R10 to provide a function of the sensing signal for integration with the first capacitor C1. The increasing value of resistors R3-R6 correspond to increasing levels of intrinsic melanin pigmentation in the skin of the user of the dosimeter. Thus, a person with extremely low levels of intrinsic melanin pigmentation would operate the dosimeter with the selector means closed at positions 1 or 2, thereby allowing the first capacitor C1 to charge up relatively quickly due to the low resistance path for the sensing signal produced by the sensing means 35. Persons with progressively higher intrinsic melanin pigmentations of their skin would operate the selector means at higher positions to provide longer charging rates for the capacitor C1.

The memory means 45 and 47 of the circuit are arranged differently with regard to their decay functions than in the previous embodiment. Moreover, the first capacitor C1 is arranged so that it no longer is connected in parallel with a discharge resistor and so relies upon its innate leakage to decay. This is possible since certain capacitors have a much higher leakage than other capacitors and so the same decay function of the first capacitor C1 as provided by the arrangement in the previous embodiment can be obtained by selecting a suitable capacitor with sufficiently high leakage.

The decay circuit of the second memory means 47 is altered to provide a rapid discharge path for the second capacitor, and so permit the use of the dosimeter by persons who have no ability to increase their level of melanin pigmentation with increased exposure to the ultraviolet radiation. Accordingly, the output of the second capacitor C2 is connected in series with a discharge diode D4 and discharge resistor R12, which in turn are connected to the common output of the first stage 65a of the first resistor means. The further diode D3 thus prevents discharge of the second capacitor C2 back through the operational amplifier 41 when the selector means 49 is switched to any of the positions 3 to 5, for use by persons having an ability to increase their melanin pigmentation level upon exposure to ultraviolet radiation. However, when the selector means is switched to either positions 1 or 2, the second capacitor C2 is allowed to discharge back through the discharge diode D4 and discharge resistor R12, then through either the short circuit 67 or the resistor R3 and ultimately through the operational amplifier 41. In this manner, accumulated charge within the second capacitor C2 is allowed to diminish or decay relatively quickly for persons using the dosimeter with the selector means switched to positions 1 or 2, but relatively slowly for persons using the dosimeter with the selector means 49 being switched to positions 3 to 5, the decay of the accumulated charge of the second capacitor C2 being provided by means of its innate leakage.

Finally, the further switching means 60 is connected between another discharge resistor R11 and the respective outputs of the first and second capacitor C1 and C2 to enable independent discharging or resetting of the first and second memory means by the user.

Figure 6:
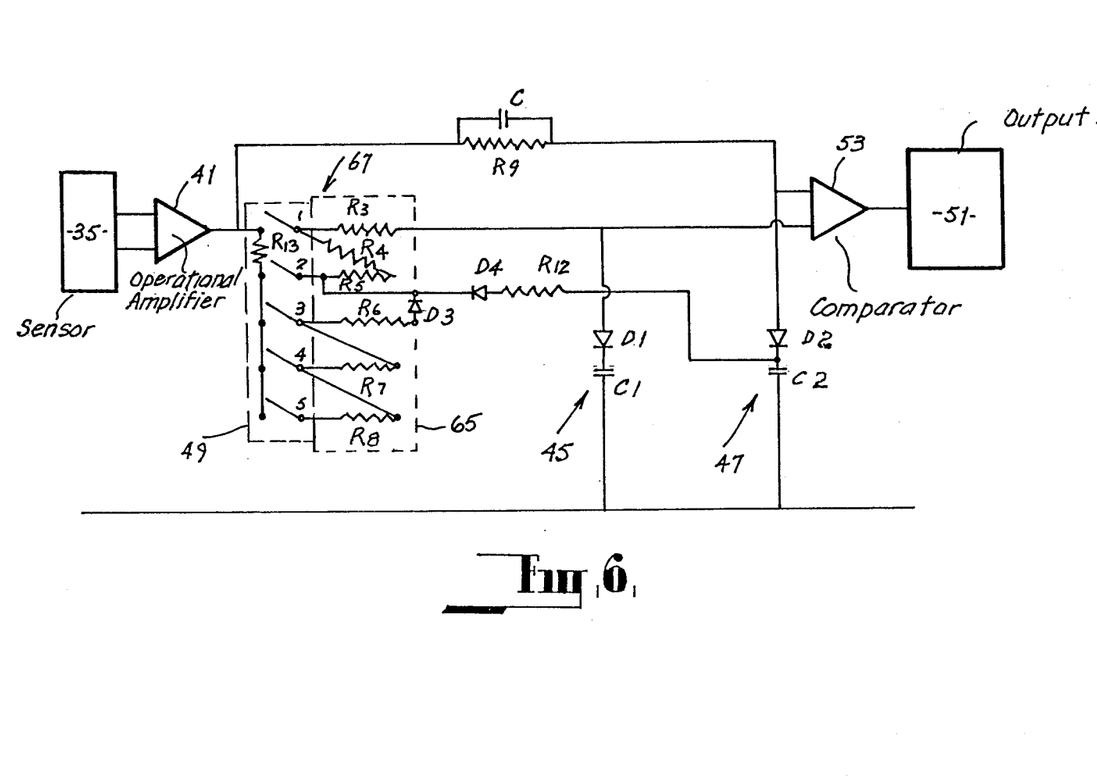
FIG. 6 is a circuit diagram schematic of the dosimeter in accordance with the fourth embodiment of the invention.

The fourth embodiment of the description is substantially similar to the two preceding embodiments and correspondingly, the same reference numerals have been used for identifying components of the dosimeter which are substantially identical to the components described in previous embodiments.

As shown at FIG. 6 of the drawings, the circuit is identical to the preceding embodiment except for the arrangement of the integrating means 43 and in particular the selector means 49 and first resistor means 65. Moreover, the first resistor means 65 is arranged in a single stage series parallel ladder bank 67 comprising resistors R13, R3–R8. These resistors are respectively connected to positions of the selector means 49 in a parallel manner, but incorporating additional connections which interconnect them in a progressive series arrangement dependent upon the particular position of the selector means which is closed. In this arrangement the resistors R3–R8 may be all of a lower nominal value than in the previous embodiment, whereby an increased value of resistance is obtained by selectively coupling the resistors into series between the selector means and the first memory means 45.

Thus, with the selector means closed at position 1, the first capacitor C1 will be connected to the output of the operational amplifier 41 via resistor R3. This circuit provides a relatively rapid integration of the sensing signal and hence relatively rapid charging of the capacitor C1. If the selector means is now closed at position 2 instead of position 1, resistors R13, R3, R4 and R5 will be coupled in series between the output of the operational amplifier 41 and the first memory means 45 to provide a higher effective value of resistance and thus a slower charging rate for the first capacitor C1. Similarly, higher switch positions of the selector means 49, when closed, provide increasingly higher values of resistance and hence result in increasingly slower rates of charging of the first capacitor C1.

With regard to the decay functions of the memory means, only the second memory means 47 is different to that of the preceding embodiment. Moreover, the further diode D3 instead of being located on the input side of the selector means 49 is now incorporated into the output side of the first resistor means 65 being directly coupled between the resistor R6, and the discharge resistor R12 and discharge diode D4. Consequently, the further diode D3 blocks discharging of the second capacitor C2 back through resistors R6–R8 when the selector means 49 is switched to positions 3–5, corresponding to persons having relatively high melanin pigmentation. However, when the selector means is switched at positions 1 or 2, the further diode D3 is bypassed allowing the second capacitor C2 to discharge back through discharge resistor R12 and discharge diode D4, through the second or first positions and ultimately through the operational amplifier 41. Thus, persons with relatively low levels of melanin pigmentation using the dosimeter with the selector means at positions 1 or 2, would not have the facility of storing accumulated charge in the second memory means.

The particular advantages that are capable of being provided by the device as described in any of the preceding embodiments include:

(1) guarding against skin cancer and premature skin ageing;

(2) recognising different skin types and automatically setting an ultraviolet dose limit accordingly;

(3) remembering the ultraviolet dose of previous days and weeks and modifying current dose accordingly;

(4) matching the melanin build up in the user's skin day be day so giving maximum safety in addition to a tan and with or without a skin protection cream;

(5) the unit can be completely sealed and is self-contained and so can be worn on a hat or other apparel such as bathing costumes etc. of a person even when swimming, thereby continuously operating to monitor the dose of ultraviolet radiation received;

(6) the device is ideal for sunbathing by providing a means to inform the user of excessive exposure to the sun at any time the user is exposed; and (7) the device can be used in any number of situations where persons may be working on road construction, building sites, farming, oil and mineral exploration, watching sporting events, gardening, washing the car etc., with or without a skin protection cream.

It should be appreciated that the scope of the present invention is not limited to the scope of the embodiment herein described. Particularly the switching means is not limited to the use of a cover and photo electric switch, but may consist of other suitable means. In addition, the sensorially perceptible alarm, is not necessarily limited to an aural signal but may also include a visual indicator to provide a visual signal or touch stimulator. Furthermore, the power source is not necessarily limited to a solar cell but may consist of any other suitable device, such as a replaceable battery, although the use of the former is preferable since the latter leads to the possibility of the dosimeter functioning incorrectly in instances where the battery was to run low, possibly causing a user to over-expose themselves to a dangerous level of ultraviolet radiation.

What is claimed:

1. A dosimeter for monitoring exposure of a body to ultraviolet radiation comprising:

a sensing means for sensing radiation impinging a body and to generate a sensing signal proportional to the intensity of said impinging radiation;

a first integrating means to integrate a first function of said sensing signal with respect to time to generate an active signal representative of the accumulated dose of radiation received by said body having regard to the intrinsic tolerance of the body to said radiation;

a second integrating means to integrate a second function of said sensing signal with respect to time to generate a reference signal representative of the optimal dose of accumulated radiation to which said body is desired to be exposed; and control means to monitor the relative magnitude of said active signal and said reference signal and generate a sensorially perceptible signal in response to the active signal magnitude attaining the reference signal magnitude.

2. A dosimeter as claimed at claim 1, wherein said first integrating means has a first memory means associated therewith to store said active signal magnitude and allow said active signal magnitude to diminish in accordance with a first prescribed decay function in response to a reduction in said sensing signal magnitude, said first prescribed decay function being related to a predetermined decay in the immediate effect of said accumulated dose on said body pursuant to said body being removed from said impinging radiation or vice versa, and said second integrating means has a second memory means to store said reference signal magnitude and allow the reference signal magnitude to diminish in accordance with a second prescribed decay function in response to a reduction in said sensing signal magnitude, said second prescribed decay function being related to a predetermined decay in the delayed effect of said accumulated dose on said body pursuant to said body being removed from said impinging radiation or vice versa, whereby the rate of decay of said first memory means is less than the rate of decay of said second memory means.

3. A dosimeter as claimed at claim 1, wherein said second function comprises initial and subsequent components, said initial component providing an initial integration at a greater rate than said first function, and said subsequent component providing a subsequent integration at a lesser rate than said first function.

4. A dosimeter as claimed at claim 1, wherein said first integrating means includes selector means to select different first functions dependent upon the tolerance of said body in connection with which said dosimeter is intended to be used.

5. A dosimeter as claimed at claim 2, wherein said first memory means comprises a first capacitor and said first function is determined by a first resistor means coupled in series with said first capacitor to form a first series R-C charge circuit.

6. A dosimeter as claimed at claim 5, wherein said first integrating means includes selector means to select different first functions dependent upon the tolerance of said body in connection with which said dosimeter is intended to be used, said selector means comprising a plurality of differently valued first resistor means and a switching means to selectively couple a single first resistor means to said first capacitor at any one time.

7. A dosimeter as claimed at claim 2, wherein said second memory means comprises a second capacitor, and the initial component of said second function is determined by a bypass capacitor coupled in series to said second capacitor, and the subsequent component of said second function is determined by a second resistor means coupled in series with said second capacitor and in parallel with said bypass capacitor.

8. A dosimeter as claimed at claim 7, wherein said first and second capacitors are arranged so that said first and second functions thereof are determined by the innate leakage of said first and second capacitors respectively.

9. A dosimeter as claimed at claim 2, wherein said second memory means is provided with resetting means to delete said reference signal magnitude stored therein upon said body being removed from said impinging radiation or vice versa.

10. A dosimeter as claimed at claim 6, wherein said second memory means comprises a second capacitor connected to said selector means for specific first functions to provide a path for discharging said second capacitor substantially instantaneously upon said body being removed from said impinging radiation or vice versa.

11. A dosimeter as claimed at claim 1, wherein said control means includes a transducing means to generate said sensorially perceptible signal, and an electronic switching means to activate said transducing means in response to said active signal magnitude attaining said reference signal magnitude.

12. A dosimeter as claimed at claim 1, wherein said control means includes triggering means to incite generation of said sensorially perceptible signal momentarily upon power being supplied to said dosimeter to indicate that said dosimeter is operational.

13. A dosimeter as claimed at claim 12, wherein said control means includes a comparator which has the active signal output and reference signal output coupled to its inputs and said triggering means comprises an actuating capacitor coupled between a power source for the dosimeter and the active signal output of said first integrating means, such that on supplying power to said dosimeter, said active signal magnitude will rapidly attain said reference signal magnitude and subsequently return to a nominal magnitude specified by said first integrating means consequential to said actuating capacitor becoming fully charged.

14. A dosimeter as claimed at claim 12, wherein said sensing means includes delay means to negate its function substantially during the momentary generation of said sensorially perceptible signal.

15. A dosimeter as claimed at claim 1, wherein said sensing means includes filtering means and detecting means, said filtering means being characterised to only allow electromagnetic radiation in the ultraviolet region of the electromagnetic spectrum to impinge said detecting means, and said detecting means being enhanced to accurately detect the impinging radiation in said region and to generate said sensing signal in response thereto.

16. A dosimeter as claimed at claim 1, including triggering means to incite generation of said sensorially perceptible signal in the absence of said sensing signal after power has been supplied to said dosimeter.

17. A dosimeter as claimed at claim 16, wherein said triggering means incites generation of said sensorially perceptible signal momentarily when both said power and said sensing signal simultaneously rapidly reduce in magnitude or become absent.

18. A method of monitoring exposure of a body to ultraviolet radiation comprising the steps of:

sensing ultraviolet radiation impinging a body; generating a sensing signal proportional to the intensity of said impinging radiation;

performing a first integration of a first function of said sensing signal with respect to time to provide an active signal representative of the accumulated dose of radiation received by said body having regard to the intrinsic tolerance of the body to said radiation;

performing a second integration of a second function of said sensing signal to provide a reference signal representative of the optimal dose of accumulated radiation to which said body is desired to be exposed;

monitoring the relative magnitude of said active signal and said reference signal; and generating a sensorially perceptive signal in response to said active signal magnitude attaining said reference signal magnitude.

19. A method as claimed at claim 18, including the step of storing said active signal magnitude and allowing the active signal magnitude to diminish in accordance with a first prescribed decay function in response to a reduction in said sensing signal magnitude, said first prescribed decay function being related to a predetermined decay in the immediate effect of said accumulated dose on said body pursuant to said body being removed from said impinging radiation or vice versa, and storing said reference signal magnitude and allowing the reference signal magnitude to diminish in accordance with a second prescribed decay function in response to a reduction in said sensing signal magnitude, said second prescribed decay function being related to a predetermined decay in the delayed effect of said accumulated dose on said body pursuant to said body being removed from said impinging radiation or vice versa, whereby the rate of decay of said delayed decay is less than the rate of decay of said immediate decay.

20. A method as claimed at claim 19, wherein said second function comprises initial and subsequent components, said initial component providing an initial integration at a greater rate than said first function, and said subsequent component providing a subsequent integration at a lesser rate than said first function.

21. A method as claimed at claim 18, including the step of inciting generation of said sensorially perceptible signal momentarily upon power being supplied to monitor said ultraviolet radiation.

22. A method as claimed at claim 21, including the step of negating the sensing step substantially during the momentary generation of said sensorially perceptible signal.

23. A method as claimed at claim 18, including the step of filtering some of the radiation to which the body is exposed to only allow radiation in the ultraviolet region of the electromagnetic spectrum to be sensed.

24. A method as claimed at claim 18, including the step of inciting generation of said sensorially perceptible signal in the absence of said sensing signal after supplying power to monitor said ultraviolet radiation.

25. A method as claimed at claim 24, wherein said sensorially perceptible signal is momentarily generated when both said power and said sensing signal are simultaneously rapidly reduced in magnitude or become absent.

* * * * *

UNITED STATES PATENT AND TRADEMARK OFFICE
CERTIFICATE OF CORRECTION

PATENT NO. : 4,851,686

DATED : July 25, 1989

INVENTOR(S) : Anthony P. Pearson

It is certified that error appears in the above-identified patent and that said Letters Patent is hereby corrected as shown below:

Column 17, line 3, Claim 18, Begin new paragraph with "generating".

Signed and Sealed this

Tenth Day of March, 1992

Attest:

HARRY F. MANBECK, JR.

*Attesting Officer*  *Commissioner of Patents and Trademarks*